June 26, 1962

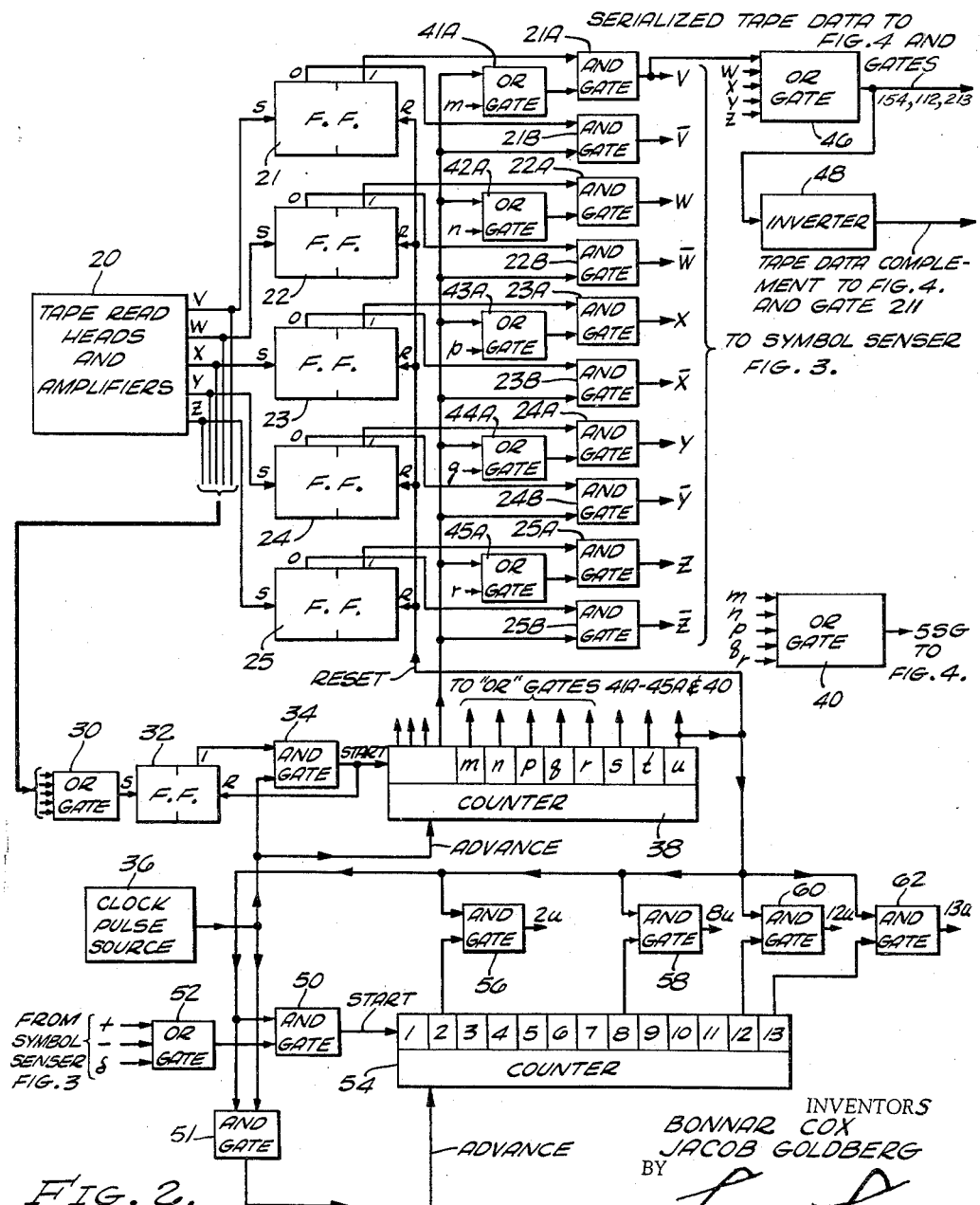

B. COX ET AL 3,040,984

DATA-CHECKING SYSTEM

Filed March 25, 1957

|   | Z | Y | X | W | V |
|---|---|---|---|---|---|
| α | 0 | 1 | 1 | 1 | 0 |
| δ | 1 | 0 | 0 | 0 | 1 |
| + | 1 | 0 | 1 | 0 | 1 |
| − | 0 | 1 | 1 | 1 | 1 |

INVENTORS
BONNAR COX
JACOB GOLDBERG
BY
ATTORNEYS

INVENTORS
BONNAR COX
JACOB GOLDBERG
BY
Lyon & Lyon
ATTORNEYS 3,040,984
DATA-CHECKING SYSTEM
Bonnar Cox and Jacob Goldberg, Palo Alto, Calif., assignors, by mesne assignments, to General Electric Company, New York, N.Y., a corporation of New York
Filed Mar. 25, 1957, Ser. No. 648,140
5 Claims. (Cl. 235—153)

This invention relates to electronic information-handling machines and, more particularly, to an improved system for checking data which has been processed by information-handling machines.

The general arrangement employed by present-day information-handling machines which are used in accounting or inventory control, for example, is to have some type of input arrangement which can receive data, a means for processing that data, and then some type of storage wherein the results of the processing are recorded. If the information-handling machine is one employed in inventory control, the data ultimately recorded may consist of the quantity of a given piece of merchandise which is initially present, the number or amounts of such merchandise which has been shipped out, the number or amounts of such merchandise which has been received, and, finally, at the end of a predetermined period of time which may be, for example, for a month, the amount of such merchandise remaining. If the information-handling machine is employed in forming accounting procedures, then for each separate account there can be recorded at the beginning of the period of activity a current balance for that account, followed by the credit and debit items occurring during the course of the period of activity, followed by the computed balance at the end of the predetermined period of activity. For example, in the banking business, the period of activity can be one day, so that for each day in a month there will appear the current balance at the end of the preceding day, followed by the activity record.

Although other forms of storage media may be employed, the one presently favored for recording this type of activity is magnetic tape. Various schemes are employed for checking data in an information-handling machine. One of these is parity; the second of these is to employ some type of error-correcting code. These schemes, however, merely check the correctness of a particular character which exists in code within the machine. For checking arithmetic computations, schemes have been developed for either repeating the computation to see if the answer is the same, performing the computation on two different circuits, or, where possible, two different ways. These checks, however, are usually performed within the computer itself. Once the data has been transferred to the tape storage medium, no further checks are made.

An object of the present invention is to provide a unique system for checking the accuracy of arithmetic data which has been transferred to a storage medium.

A further object of the present invention is to provide a novel system for checking the correctness of the data which has been transferred to the storage medium.

Yet another object of the present invention is a novel system for checking simultaneously both the accuracy of the data transferred to a storage medium, as well as the accuracy of the arithmetic operation which has been previously performed on that data and recorded in that storage medium.

These and other objects of this invention are achieved by providing the system wherein data which has been recorded on a storage medium in the form of a balance followed by debit and credit items occurring over a predetermined period followed by a second balance at the end of that predetermined period for each of a plurality of different accounts may be error checked, both for the accuracy of the arithmetical calculation, as well as the accuracy of the data recorded in the medium. The medium may be either magnetic or paper tape. The tape is moved forward. Means are provided for sensing the beginning of each account, the balance to appear first thereafter, and whether an item is a debit or a credit. An arithmetic circuit is provided which is capable of performing either addition or subtraction. Provision is made to enter into the arithmetic unit the debit and credit items as they are read from the tape. A storage means, such as a shift register, is employed at the output of the arithmetic unit to receive the result of the computation by the arithmetic unit.

When a new account is sensed, then the shift register is cleared, for example, by inserting all zeros therein. When the first balance appears, provision is made to enter it into the shift register. When the first item appears after the first balance, the nature of the item is sensed and the arithmetic circuit is instructed to either add or subtract. The contents of the shift register are entered into the arithmetic circuit, which then performs the indicated computation. The output of the arithmetic circuit is applied to the shift register, which then enters it into the arithmetic circuit again when the next item is received from the storage medium. The arithmetic unit again performs the computation in accordance with whether or not the item which has been entered is a debit or a credit item.

When the next current balance is sensed, it is again entered into the shift register at the same time that the contents of the shift register are being shifted out. Comparator means are actuated at this time to compare this next current balance with the number being shifted out from the register. If they are identical, then it is known that the arithmetic computations are correct and the data which is read from the tape is correct. If they are dissimilar, then either the recording was incorrect or the arithmetic computation was incorrect, and an alarm is actuated to provide an indication thereof. This operation continues with the new balance read from the storage medium substituted for the one which was calculated. Thus, there is no stoppage of the scanning of the storage medium or slowdown required. Furthermore, it is not necessary to store the data from the storage medium in any intermediate storage register. Means may be provided for marking the storage medium whenever an error appears, so that it is not necessary to halt the checking process whenever an error occurs. A return can subsequently be made to the point at which the error is indicated for correction thereof.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 illustrates the manner of storing data to be checked in accordance with this invention on tape;

FIGURE 2 is a block diagram of a tape-reading arrangement for illustration of a suitable one for use with this invention;

Figure 3:
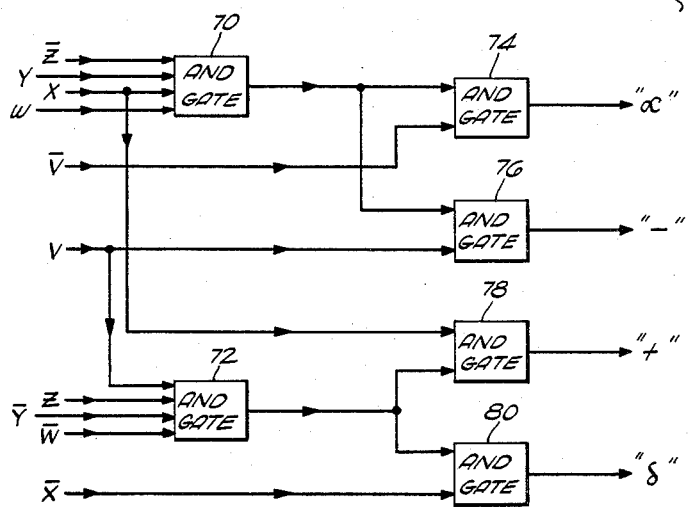
FIGURE 3 is a block diagram of a symbol senser illustrative of a suitable one for use with this invention.

For the purpose of facilitating an understanding of this invention, as well as to render the explanation thereof less complicated, it will be assumed that the activity which provides the data which is processed by an information-handling machine is the banking business. This is not to be construed as a limitation upon the invention, but merely by way of illustration of its application. In the banking business, records are kept for each account of the current balance for that account at the beginning of the day, the debit and credit items which occur during the course of that day, and then at the close of the day the current balance is computed for the following day. Let it be further assumed that the storage medium employed is magnetic tape and that the information recorded thereon has the format shown in FIGURE 1. The tape fragment shown therein contains an indication of the type of data recorded for an account for one day.

For each different account number on the magnetic tape 10 there is recorded an alpha, indicative of the fact that the next account is beginning, which is followed by the account number. Other pertinent data, such as the name and address, classification of the account, may be included in the space following the account number, but is not shown since it is of no concern to this particular description. At the termination of the space required for identifying the account, there is shown other data indicative of the time on which date the record which follows is commenced. Thus, a symbol delta precedes the date information. This date information is then followed by a positive symbol and then the amount for the current balance. Thereafter, the activity for the predetermined period, which has been established as one day, is recorded.

In the example shown in FIGURE 1 for the day in question there occurs a debit item which is preceded by a minus sign, then a credit item which is preceded by a plus sign. The debit item might indicate a withdrawal; the credit item a deposit. Thereafter, again, a delta appears indicative of the fact that the information following is the date, and thereafter the current balance. This type of daily record is kept for all accounts for an entire month. Space is allotted on the tape for each account for the expected activity for a month. Each account starts after the activity space of the preceding account. Since the activity for several thousand accounts may be recorded in the manner described, it will be appreciated that an arrangement for checking this data must perform such checking as rapidly as possible. Although checks are made within the system which precedes this tape and presumably checks are made as the data is written on the tape, it is advantageous to see whether or not this data can be read back correctly, and, also, whether or not the arithmetic activity of the preceding system has been performed correctly. This is especially true in the banking business, where errors cannot be tolerated, not only from the standpoint of the loss of money entailed, but also from the possible loss of good will and business.

As pointed out above, the present invention operates to check each account by taking the first balance for that account, subtracting or adding thereto the debit and credit items which occur thereafter, and checking the final result with the next balance recorded for the following day. This next balance then has the succeeding debit and credit items respectively subtracted or added thereto, and the check is then made of the result with the succeeding balance, etc. In the operation of this system, it is required that the beginning of each account be sensed, a current balance be sensed, and the nature of the item—that is, debit or credit. As described above, this may be performed simply by providing symbols which precede the various items requiring sensing. This should not be construed as a limitation, since alternative arrangements may mean positional notation for the number of characters in the word being considered. The present embodiment of the invention uses the symbol alpha to indicate the beginning of each account. The symbol delta is employed to indicate that a date follows. Immediately following the date, there will always be the current balance for that date. The current balance is always preceded by the sign plus or minus, and a debit or a credit is distinguished by the sign minus or plus, which precedes the amount of the debit or credit.

In accordance with the customary method for recording digital data on tape, such data will be considered as being recorded by means of several recording heads which are positioned adjacent one another over several tracks extending the length of the tape, and these recording heads, in accordance with the customary practice, may also be employed for reading out the data which has been recorded. The data is recorded in the binary code, and each character or digit of a decimal number consists of several binary bits which are recorded in adjacent positions on the adjacent tracks. In an embodiment of the invention which was built and operated, numbers were represented by an excess-three binary-coded decimal code with four binary bits of the code representing a decimal digit and a fifth bit having nonnumeric significance. The fifth bit was disregarded in all arithmetic operations which were carried on with only four bits.

FIGURE 2 is a block diagram of a preferred arrangement for reading out the data on a magnetic tape and providing synchronizing signals for the remainder of the apparatus required in the invention. The rectangle 20 represents the typical tape-read heads and amplifiers which are employed. By this it is meant to be understood that there is one tape-reading head over each track on the tape which drives a succeeding amplifier. Let it be assumed that a five-bit code is employed for each character or digit as indicated above. Each bit position in a character or digit is represented by the letters $v$, $w$, $x$, $y$, $z$, with $v$ being in the least-significant position. The presence of a one in the bit position is represented by the small-case letter; the presence of a zero in the bit position is represented by the small-case letter with a bar over it; thus, $v$ represents a one in the least-significant bit position, and $\bar{v}$ represents a zero in the least-significant bit position.

For the symbol senser which will be shown in FIGURE 3, it is necessary to staticize the five bits. For the apparatus which provides the checking operation, it is necessary to provide serialized data. The block diagram shown in FIGURE 2 shows how both of these functions may be accomplished. The five outputs from the tape read heads and amplifiers, respectively labeled $v$, $w$, $x$, $y$, $z$, are applied to the set sides of five flip-flops, respectively designated as 21 through 25. If a one occurs in the $v$ position, then the flip-flop 21 is set. If a one does not occur, then the flip-flop 21 does not become set, but remains reset. It is believed that the operation of the flip-flops, in response to inputs to one of their sides to provide an output which represents an input having been applied or not, is too well known to require further description at this time. It should suffice to say that the flip-flops 21 through 25 will assume set or reset conditions in accordance with the presence or absence of bits for the character which is being read by the five tape read heads. The one outputs of the five flip-flops 21 through 25 are respectively applied to five AND gates 21A through 25A. The zero outputs of the five flip-flops 21 through 25 are respectively applied to five AND gates 21B through 25B. These AND gates are well-known coincidence circuits which require the simultaneous application or presence of all their inputs before they emit an output.

The outputs $v$, $w$, $x$, $y$, $z$ from the tape read heads and amplifiers 20 are all applied to an OR gate 30. Thus this OR gate will provide an output as soon as any one of the output leads $v$, $w$, $x$, $y$, $z$ receives a signal indicative of a bit being read in the particular character passing under the read heads. The OR gate 30 sets a flip-flop 32, the one output of which is applied to an AND gate 34. This AND gate receives as its second required input clock pulses from a clock-pulse source 36. A clock-pulse source is a well known source of synchronizing pulses which in any information-handling machine is usually provided by a stable oscillator or pulses recorded and read from the periphery of a magnetic drum. These clock pulses are used to time the operation of the information-handling machine.

The output of the AND gate 34 consists of only one clock pulse from the source 36 because flip-flop 32 is reset by the first output of AND gate 34. This serves to start a counter circuit 38, which advances thereafter as each clock pulse occurs. This counter has a number of counting states, shown as arrows emanating from the rectangle representative of the counter 38. The fourth of these counting states is labeled "quiz," and the remainder of these counting states are labeled with the small-case letters $m$, $n$, $p$, $q$, $r$, $s$, $t$, $u$. The quiz-counting state occurs at a suitable interval after the first bit evidences its presence to the OR gate 30 for the purpose of enabling compensation for the effects of skew on tape. In other words, the interval occurring up until the quiz pulse is emitted comprises the collection time for the five bits of a character being read. The reason for the collection time being provided is that one side of the tape may stretch more than the other side, thus skewing the bits. Counter 38 must complete its count and be ready for a new count before the succeeding digit, or character, appears on the tape. Counters of the type generally described are well known in this art. A preferred arrangement is shown and described in an application for patent assigned to this assignee by James E. Heywood for Gated-Delay Counter, Serial No. 400,645, filed December 28, 1953.

The $m$, $n$, $p$, $q$, and $r$ outputs of the counter 38 are applied to an OR gate 40, whose output is labeled 5SG. This 5SG output is one which lasts over the interval of the occurrence in serial form of the five bits which are read from the tape.

AND gates 21B through 25B have as their second required inputs the quiz-pulse output of the counter 38. AND gates 21A through 25A receive their second required inputs from OR gates 41A through 45A. These OR gates have as one input the quiz-pulse output of the counter 38. The second inputs are received from the respective $m$, $n$, $p$, $q$, $r$ outputs of the counter. Therefore, in operation, the output of the tape read heads 20 do or do not set the flip-flops 21 through 25. The flip-flop outputs are applied respectively to the AND gates 21A, 21B through 25A, 25B. These AND gates are enabled to provide an output or not when the quiz-pulse is received from the counter 38. This output is applied to the symbol senser, which is shown in FIGURE 3. In addition, the AND gates 21A through 25A are successively enabled when the $m$, $n$, $p$, $q$, and $r$ outputs are applied successively thereto. This, in effect, serializes the tape data, whereas the quiz pulse serves to establish the tape data in parallel. The serialized tape data is applied to an OR gate 46, which is connected to the outputs of the AND gates 21A through 25A. The output of the OR gate 46 is a serialized tape data. Also connected to the output of the OR gate 46 is an inverter 48. The output of the inverter is the complement of the serialized tape data. The inverter is merely a single state of amplification which provides as its output the phase-inverted input.

Referring back to the counter 38, the $u$ output thereof is applied to an AND gate 50. This AND gate receives a second required input from an OR gate 52. This OR gate is enabled whenever the symbol senser applies thereto a signal indicative of a plus or a minus or a delta symbol having been sensed. Thus, the output of the AND gate 50, consisting of a single pulse, is applied to start a succeeding counter 54. The last state, "$u$," of counter 38 also energizes another AND gate 51, which responds to clock pulses and with the output resulting advance a counter 54 at the end of the serialization of each tape digit. Counter 54 may be similar in construction with counter 38. Thus, counter 54 is enabled to advance one count each time a symbol has been sensed and the counter 38 has completed a cycle. There are thirteen count states for the counter 54. A word module comprises the data in a tape section as shown in FIGURE 1, i.e., + or − followed by a debit or credit, or a delta symbol followed by the date. Assuming that each word module in the present system being described consists of twelve digits or characters, the actual data within such module being read at the moment, which appears at the output of the tape-read system may be identified. Timed outputs at the trailing edge of digit states are derived by combining the count outputs of counter 54, as well as the $u$ output of counter 38, and applying them to an AND gate 56. An 8U output is obtained by applying both the $u$ output of counter 38 and the 8-count output of counter 54 to an AND gate 58; a 12U output is derived from AND gate 60 by applying to its inputs the $u$ output of counter 38 and the 12-count output of counter 54. A 13U output is derived from a counter 62 by applying the $u$ output of counter 38 and the 13-count output of the counter 54.

It should therefore be apparent from the above description that the structure shown in FIGURE 2 provides the tape data in serialized form, as well as in parallel form. Also, the tape-data complement is provided. Certain required timing pulses are provided by counters 38, 54 which are synchronized from a clock-pulse source. One of these counters 38 provides an output for each bit of a digit on tape plus some extra outputs required for timing. The other counter 54 provides an output for each digit in a word of the tape data.

FIGURE 3 shows a block diagram of the symbol senser, as well as the table showing the representation by way of example of the symbols which are to be sensed. The binary bit positions within the respective characters or symbols are also shown in the table in FIGURE 3. In accordance with the previously described rules, the alpha symbol requires the sensing of $\bar{v}\ w\ x\ y\ \bar{z}$, corresponding to 01110. A $w$, $x$, $y$, and $\bar{z}$ are simultaneously applied to an AND gate 70. Its output and $\bar{v}$ are applied to an AND gate 74. Accordingly, AND gate 74 provides an output indicative of the symbol alpha having been sensed by the reading heads.

The symbol minus requires the sensing of $v\ w\ x\ y$ and $\bar{z}$. A $w$, $x$, $y$, and $\bar{z}$ are sensed and indicated as being present by the output of the AND gate 70. This output and $v$ are applied to an AND gate 76. Thus, when the AND gate 76 provides an output, it is indicative of the fact that a minus symbol has appeared under the tape reading heads.

The delta symbol is sensed by sensing $v\ \bar{w}\ \bar{x}\ \bar{y}\ z$. A $v$, $\bar{w}$, $\bar{y}$, and $z$ are applied to an AND gate 72. The output of this AND gate is applied through another AND gate 80. The second required input to the AND gate 80 is provided by the $\bar{x}$. Therefore, when an output is received from AND gate 80, it is indicative of the fact that the delta symbol has been sensed. The plus symbol requires the sensing of $v\ \bar{w}\ x\ \bar{y}\ z$. The output of AND gate 72, indicative of $v\ \bar{w}\ \bar{y}\ z$ being sensed, is applied to an AND gate 78. The second input to this AND gate is $x$. The output of this AND gate will be present when a plus symbol has been sensed. Therefore, the circuit shown in FIGURE 3 provides as an output an indication of the symbols which have been sensed.

Figure 4:
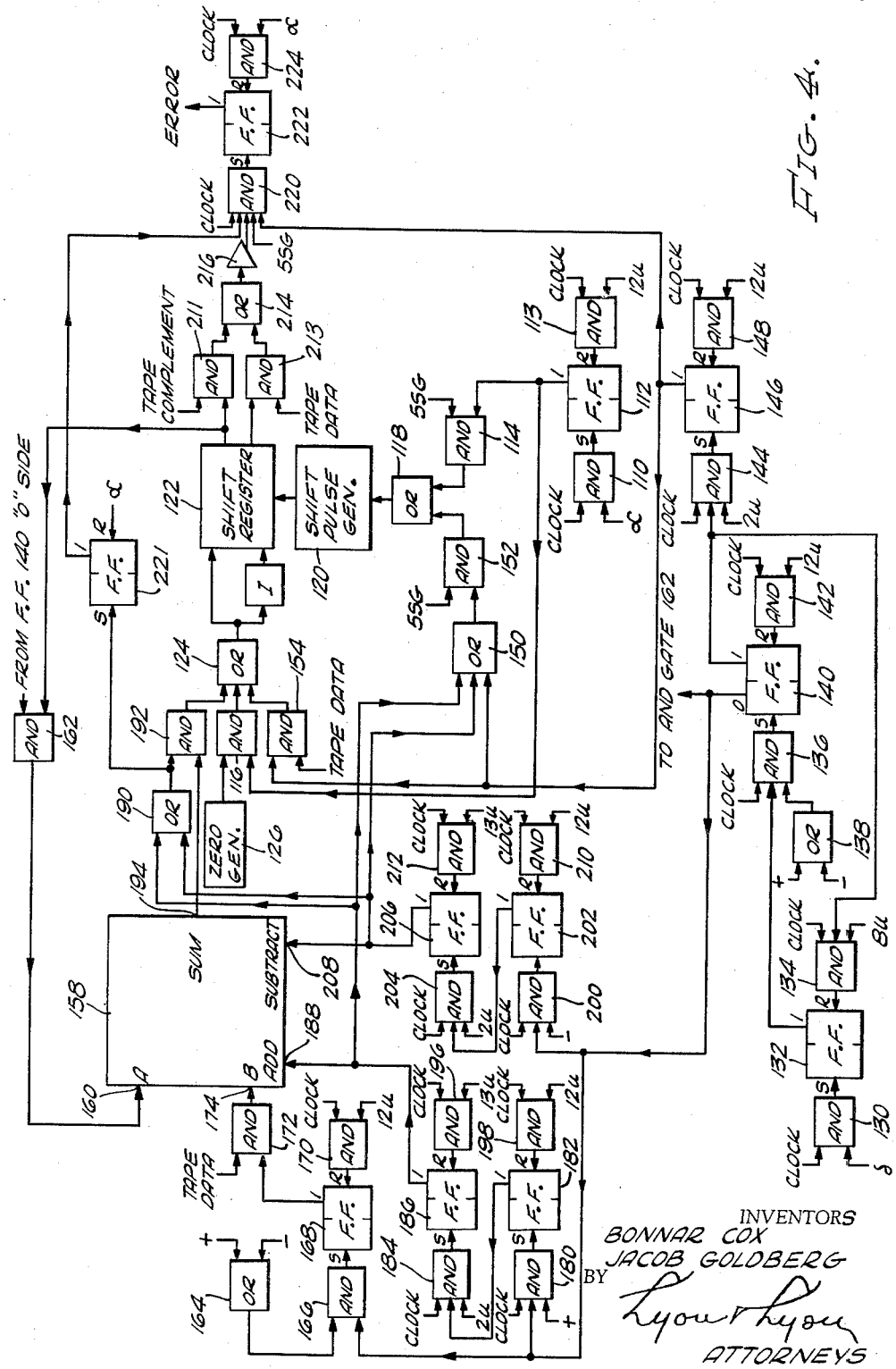
FIGURE 4 is a block diagram of a checking arrangement employed in the embodiment of the invention.

Reference is now made to FIGURE 4, which shows the actual checking circuitry which is employed in the embodiment of the invention. In addition to the well-known flip-flops, AND gates, and OR gates, there are also required an arithmetic circuit, a register of the shift register type, and a zero generator. The shift register is a well-known circuit which is described and shown, for example, in an article by Stevens and Knapton in Electronics magazine, entitled, Gate-Type Shifting Register, found on pp. 186–192, of the December 1949 issue, vol. 22, published by the McGraw-Hill Book Company. Not only the one cited, but also any of the other well-known types may be employed which permit the serial shifting in and shifting out of their contents. The arithmetic circuit is another well-known type of circuit and an example of a suitable arrangement is described and shown in the book by the Engineering Research Associates entitled, High-Speed Computing Devices, published by the McGraw-Hill Book Company in 1950. A suitable arrangement is described on pp. 288 et seq. This arithmetic circuit has two data-input terminals and what may be termed a sum or computation-result output terminal. Also, in said circuit are two control terminals. When one of these is excited, it instructs the arithmetic circuit to add the data being received on its two data-input terminals; when the other of these is excited, it instructs the arithmetic circuit to subtract the data being received on its data-input terminals. In the absence of instructions on its terminals, data does not enter the arithmetic circuit.

Let it be assumed that the tape is positioned with the reading head just before the first of the accounts to be read. The tape is then started forward. The symbol sensers will then sense the presence of an alpha, indicative of the beginning of the account. This alpha, together with a clock pulse from the clock-pulse source, is applied to an AND gate 110. The output of the AND gate will set a flip-flop 112. The output of this flip-flop, when set, is applied to an AND gate 114 and to another AND gate 116. The second required input to the AND gate 114 is the 5SG pulse, which is the output of the OR gate 40 in FIGURE 2. The output of the AND gate 114 is applied to an OR gate 118, which applies its output to the shift-pulse generator 120. The shift-pulse generator generates shift pulses to shift out the contents of the shift register 122 and also shift thereinto any input which may be received through an OR gate 124. It should be noted that the shift-pulse generator is enabled only as long as the 5SG pulse lasts, which is during the interval of the five bits in a digit. However, since a 5SG pulse is provided for every digit, the register 122 will be able to enter thereinto 10 digits, which is the length of the dollar-value portion of the 12-digit tape word.

The second required input at this time to enable an output to be derived from the AND gate 116 is provided by a decimal zero generator 126. The zero generator is merely a circuit for getting the shift register to hold all zeros. These zeros are entered through the OR gate 124 into the register 122, whereby the register is cleared out and ready to commence operation. It should be noted that the flip-flop 112 is reset by a 12U pulse, which is applied together with a clock pulse, to an AND gate 113. Thereby, the zero generator is enabled to enter zeros into the shift register over the duration of a complete word. The zero generator may be a pulse generator which continuously generates output pulses representative of a zero in the binary code being employed. Alternatively, if an excess-three binary code is employed, where a zero is equal to 00011 or three in the plain binary code, then the zero generator can be an arrangement such as the one shown in FIGURE 2, wherein the tape data is serialized. This consists of five flip-flops which are set or reset to provide an output voltage pattern representative of zero. The outputs of these flip-flops are connected to five AND gates which are successively opened in response to m, n, p, q, r pulses. The five AND gates have all their outputs applied to an OR gate, the output from which is connected to the AND gate 116. The reason for inserting zeros into the shift register, besides for clearing it out, is because some accounts may not have any current balance initially recorded. These may start with a creditor a debit. In this event, the system enters the zeros into the arithmetic circuit at the indicated time.

As the tape continues to move the next symbol of interest which is sensed will be the delta symbol, indicative of the fact that a date is present. The delta symbol, together with a clock pulse, is applied to an AND gate 130. This AND gate sets a flip-flop 132. This flip-flop may be reset upon an 8U pulse, a clock pulse, and a one output from a flip-flop 140 being applied to an AND gate 134. The output of this AND gate is applied to the reset terminal of this flip-flop 132.

The one output of the flip-flop 132 is applied to an AND gate 136. This AND gate is enabled upon receiving a clock pulse, together with an output from an OR gate 138. This OR gate will provide an output upon the symbol plus or minus being applied to its input from the symbol generator. In accordance with the tape specimen shown in FIGURE 1, the plus symbol occurs before the first current balance immediately after the first date. Thus, the symbol which is in front of the first current balance causes an output from the AND gate 136, which sets the flip-flop 140.

Flip-flop 140 is reset by the output of an AND gate 142. This AND gate is enabled upon receiving a clock pulse in addition to the 12U pulse from the counters 38 and 54 in FIGURE 2. The one output of flip-flop 140, indicative of the fact that a current balance is also appearing, is applied to an AND gate 144. Upon the occurrence of a clock pulse and a 2U pulse, this AND gate can set a flip-flop 146. It should be noted that the symbol occurs during the one time of the counter 54; the current balance commences at the two time. Flip-flop 146 is reset by receiving the output of an AND gate 148 at 12U time, together with a clock pulse.

When flip-flop 146 is in its set condition, its output is applied to a number of places. One of these is the OR gate 150. The output of this OR gate is applied to an AND gate 152. The AND gate 152 has as its second required input the 5SG pulse. The output of AND gate 152 is applied to the OR gate 118, which as previously indicated, serves to enable the shift-pulse generator. The set or one output of the flip-flop 146 is also applied to an AND gate 154. The second required input to this AND gate is tape data received through the OR gate 46 in FIGURE 2. Thus, the output of the AND gate 154 is applied to the OR gate 124, which as previously described provides an input to the register 122. From the description above, therefore, it should be noted that upon the occurrence of the first current balance after the date, the gate 154 is opened and a shift pulse generator is energized to permit the entrance of the current balance into the shift register 122.

It should be noted that the output of the shift register 122 is applied to one data-input terminal 160 of the arithmetic circuit 158. In the path between the shift-register output and the arithmetic circuit input there is an AND gate 162. This AND gate is maintained closed during the time a balance is entered into the shift register. This is insured by applying as a second required input to this AND gate (the first being the output of the shift register) the zero, or reset, output of the flip-flop 140. It will be recalled that this flip-flop remains set during the time a balance is being read.

Assume now that a balance has been entered into the shift register and the first item follows thereafter. The symbol senser applies the sign plus or minus to an OR gate 164, the output of which is applied to an AND gate 166. A second required input to this AND gate 166 is the output of the flip-flop 140 when in its reset condition. It will be recalled that this occurs after a current balance has been read. The output of the AND gate 166 sets a flip-flop 168. This flip-flop will remain set until an AND gate 170 resets it at 12U time. The set output of the flip-flop 168 is applied to an AND gate 172. The other required input to this AND gate is tape data. The output of this AND gate is applied to an input terminal 174, which is the second data input terminal for the arithmetic circuit. Therefore, from the previous description it should be observed that the AND gate 172 will enter into the arithmetic unit the debit and credit items on the tape. Other unrelated data, such as dates, account numbers, etc., are not permitted to be entered into the arithmetic unit. Also, the current balance is not entered into the arithmetic unit directly from tape.

Assume now that the first item which appears after a current balance has been read is a credit item. The symbol senser applies its output plus to an AND gate 180. The second required input to that AND gate is the zero, or reset, output of the flip-flop 140. Upon a clock pulse being applied to AND gate 180, it sets a flip-flop 182. The output of this flip-flop, when in its set condition, is applied to an AND gate 184. Upon the occurrence of 2U time and a clock pulse, this AND gate sets a flip-flop 186. The set output of this flip-flop is applied to the input terminal 188 of the arithmetic circuit, which instructs it to add the data being applied to the data input terminals. At this time, the one output of the flip-flop 186 is also applied to two OR gates, one of these being the OR gate 150, which, as previously described, serves the function of applying an input to the AND gate 152, and upon the subsequent occurrence of the 5SG pulses, energizes the shift-pulse generator through the OR gate 118. The second OR gate 190 applies its output to an AND gate 192. This opens the data path between the output sum terminal 194 of the arithmetic circuit to the shift register 122.

The shift register shifts into the arithmetic circuit the current balance held by it at the same time that the credit item is being read from the tape. One digit time later, the sum appears, and this is entered into the shift register. Flip-flop 186 is reset by the application of a clock pulse and a 13U pulse to an AND gate 196 connected to its reset input terminal. Flip-flop 182 is reset by the application of a 12U pulse and clock pulse to an AND gate 198, which is connected to its reset input terminal. Although the input data to the arithmetic unit ends at 12U time, the output to the register ends at 13U time, due to the one-digit delay in the arithmetic unit.

Assuming that the item which follows the credit item is a debit item, then a minus output of the symbol senser together with a clock pulse enables an AND gate 200 to set a flip-flop 202. The set output of this flip-flop, together with a 2U pulse and a clock pulse, enables an AND gate 204 to set a flip-flop 206. The output of this flip-flop, when set, is applied to the subtract input terminal 208, which instructs the arithmetic circuit to subtract the data being applied to its data-input terminals. The output of the flip-flop 206 is also applied to the OR gates 150 and 190, whereby the shift register is enabled to receive the difference from the output terminal 194 of the data being subtracted within the arithmetic circuit. The flip-flops 202 and 206 are respectively reset by the same reset inputs as are applied to the flip-flops 180 and 186. Flip-flop 202 has an AND gate 210 connected to its reset terminal, and this AND gate is energized to provide an output upon a clock pulse and a 12U pulse being applied thereto. An AND gate 212 resets flip-flop 206 when a clock pulse and a 13U pulse are applied to its inputs.

The arithmetic circuit continues to add or subtract the incoming transaction items from the results of the arithmetic operations which are entered into the shift register 122 and then recirculated into the arithmetic circuit. The next time the delta signal appears, indicative of the fact that the transactions for the day have ended and what follows is the following day's data plus the current balance, flip-flops 132, 140, and 146 are again set, whereby both the tape-data input to the arithmetic circuit and the circuits for instructing the arithmetic circuit in response to the plus or minus symbol are rendered inoperative. AND gate 154, as well as AND gate 152, are both enabled to enter into the shift register the new current balance when it is read from the tape through OR gate 124. Simultaneously therewith, the calculated balance in the shift register 122 is shifted out. This is not re-entered into the arithmetic circuit, since the AND gate 162 is now closed in view of the fact that the flip-flop 140 is in its set condition. The shifted-out balance of the register is applied to two AND gates 211, 213. Since the shift register consists of a plurality of flip-flop circuits in tandem, with means for transferring the condition of a preceding flip-flop circuit to the succeeding flip-flop circuit, in order to obtain an output indicative of the bit being stored at the output stage of the register, as well as its complement, all that is necessary is to make connections to the set and reset terminal outputs of this last register stage. This is what is represented by the two connections represented as one and zero which are connected from the last stage of the register to the two AND gates 211 and 213. These connections consist of the bit stored in the last register and its complement. The input to the two AND gates 211 and 213 from the tape data is derived from the output of OR gate 46, shown in FIGURE 2.

From the above, it should be apparent that what is applied to AND gate 211 is data from the register and the complement of that data from the tape and what is applied to the AND gate 213 is data from the tape and the complement of that data from the register. Accordingly, as long as the register and tape data are identical, no output will be obtained from either of the AND gates. As soon as the tape data and the register data differ, output is received from one of the AND gates. This output is applied to an OR gate 214 and through a cathode follower 216 to an AND gate 220. To be opened, this AND gate requires an output from the flip-flop 146 when in its set condition, an output from flip-flop 221 when in its set condition, a 5SG pulse, and a clock pulse. Flip-flop 146 is set when a balance is read. Flip-flop 221 is set from OR gate 190 when the sign of the first debit or credit item is sensed. It is reset by the alpha symbol of the next account. This insures comparison upon the second current balance of an account being received and avoids any false indication when the first balance is read. The output of AND gate 220 is connected to a flip-flop 222, which may be called the error flip-flop. This flip-flop is set when current-balance data from the tape and the calculated-balance data from the register are different. When this occurs, the set output of the flip-flop can be made to actuate any type of an indicator and also to record a mark if desired on a track on the tape at the location at which the error is noted. This flip-flop is reset when an alpha symbol is read, together with a clock pulse, which two signals are applied to the resetting AND gate 224. Thus, the error flip-flop is reset when the next account begins.

From the system which has been described, it should appear that it is not necessary to stop the tape in the course of operating the checking routine. The operation may extend over any length of tape as needed, or over portions of the tape without requiring a return to a set beginning for the checking routine. This system has the further advantage that it checks the tape as it moves, or "on the fly," since no intermediate storage system is necessary into which the tape contents must be emptied prior to comparison or arithmetical calculations. As a result of the digit-by-digit checking of the data as it is read from the tape when an error appears, the tape can be marked at the location of the error, thus obviating extensive scanning to establish the location thereof subsequently.

Although the description herein has been given in terms of a banking business, it should be apparent that many other types of activities requiring mathematical checks can employ this technique. It is applicable to other types of accounting activity, as well as inventory-control activities. The handling of negative balances with this system is readily performed by employing the representation of negative numbers as a complement with respect to ten.

Accordingly, there has been described and shown a novel, useful, and unique circuit for checking the data upon which arithmetic processes have been performed, as well as the result of the arithmetic processes, which data has been recorded on a storage medium.

We claim:

1. An error-checking system for arithmetic data recorded as signals on a storage medium and including signals representative of and identifiable as a first balance followed by signals representative of and identifiable as one or more debit and credit items followed by signals representative of and identifiable as a second balance said system comprising means to read said data in sequence from said storage medium, an arithmetic circuit having first and second data input terminals and a resultant calculation output terminal, means for coupling output from said means to read to said first data terminal, means for holding output from said resultant calculation output terminal, first means for sensing balance signals being read by said means to read said data, means responsive to said first means for sensing balance signals being read for entering said balance signals from said means to read said data into said holding means, second means for sensing whether signals representing a debit or a credit item is read by said means for reading, means for applying the contents of said means for holding to said arithmetic circuit second data input terminals responsive to said second means sensing debit-item or credit-item signals, means responsive to said second means sensing debit item signals to instruct said arithmetic circuit to subtract the data applied to its input terminals and responsive to said second means sensing credit item signals to instruct said arithmetic circuit to add the data applied to its input terminals, and means responsive to second balance signals being read by said reading means to compare said second balance signals for identity with the contents of said means for holding.

2. An error-checking system for arithmetic data recorded as signals on a storage medium and including signals representative of and identifiable as a first balance followed by signals representative and identifiable as one or more debit and credit items followed by signals representative of and identifiable as a second balance, said system comprising means to read said data out from said storage medium in sequence, a register, an arithmetic circuit, means for entering signals representative of a balance into said register each time it is read from said storage medium, means for entering the contents of said register and signals representative of an item from said storage medium into said arithmetic circuit, first means for indicating when item signals read by said means represent a credit item, second means for indicating when item signals read by said means represent a debit item, means for instructing said arithmetic circuit to add responsive to output from said first means and to subtract responsive to output from said second means, means for entering the resultant calculation of said arithmetic circuit into said register, and means for comparing for identity the contents of said register with said signals representative of the next balance being entered therein from said storage medium.

3. An error-checking system for transactions recorded as signals on an elongated storage medium and including signals representative of and identifiable as a first balance followed by signals representative of and identifiable as one or more credit and debit items occurring over a predetermined interval followed by signals representative of and identifiable as a second balance, said system comprising an arithmetic circuit having two data input terminals and a resultant calculation output terminal, a shift register having an output and an input, means coupling said shift register input to said calculation output terminal, means coupling said shift register output to one data input terminal, means for reading said transactions serially out from said storage medium, first means for sensing and providing an output when signals representative of a balance are being read out, means responsive to said first means for entering said signals representative of a balance into said shift register, means for applying the output of said means for reading to the other of said data input terminals, second means for sensing whether when signals representative of a credit item are being read by said means for reading, third means for sensing when signals representative of a debit item are being read, means for instructing said arithmetic circuit to add responsive to output from said second means for instructing said arithmetic circuit to subtract responsive to output from said third means, means for shifting out to said one data input terminal the contents of said register while shifting into said register the calculation output of said arithmetic circuit responsive to output from said second means and third means for sensing, and means responsive to signals representative of the next balance being sensed by said first means to compare said next balance signals with the contents of said shift register for identity.

4. A system for checking the accuracy of recording and of computations performed on account ativity data which is recorded on tape for each different account as signals representative of and identifiable as a first balance followed by signals representative of and identifiable as the debit and credit activity over a predetermined period followed by signals representative of and identifiable as the balance at the end of said period said system comprising means for reading the signals representative of the data on said tape, first means for sensing the reading of signals at the beginning of each account, a shift register, means responsive to said first means for sensing for clearing said shift register, an arithmetic circuit having two data input terminals and a resultant calculation output terminal, means for applying the output of said means for reading to one of said data input terminals, means for applying the contents of said shift register to said other data input terminal each time said means for reading applies signals representative of a debit item or a credit item to said other data input terminal, second means for sensing signals representative of a current balance being read, means responsive to said second means for entering said signals representative of a current balance into said shift register, third means for sensing whether signals representative of an item which have been read is a credit or a debit item, means for ordering said arithmetic circuit to add the data applied to its two data input terminals responsive to a credit item being sensed by said third means and to order said arithmetic circuit to subtract the data applied to its two data input terminals responsive to a debit item being sensed by said third means, and means responsive to said second means for comparing for identity the contents of said shift register with signals representative of a balance read at the end of an activity period.

5. A system for checking the accuracy of recording and of computations performed on account activity data which is recorded on tape for each different account as signals representative of and identifiable as a first balance followed by signals representative of and identifiable as debit and credit items occurring over a predetermined period followed by signals representative of and identifiable as the balance at the end of said period, each different account and debit, credit and balance items being preceded by signals providing an identifying symbol, said system comprising means for reading said data sequentially from tape, symbol signal sensing means coupled to said means for reading for providing a separate output indicative of the type of identifying symbol signals which has been read, an arithmetic circuit having two data input terminals and a resultant calculation output terminal, a shift register having an input coupled to said arithmetic circuit output terminal and an output coupled to one of said data input terminals, means coupling said means for reading to said other of said data input terminals including means to prevent application of data to said other data input terminal except when said symbol sensing means senses signals representative of a credit or debit item, means responsive to said symbol sensing means sensing signals representative of the beginning of a new account to clear out any signals representative of numbers from said shift register, means responsive to said symbol sensing signals indicative of means sensing a balance to enter said balance signals into said shift register, means responsive to said symbol sensing signals indicative of means sensing a credit to instruct said arithmetic circuit to add the data signals applied to its data input terminals and sensing signals indicative of a debit to instruct said arithmetic circuit to subtract the data signals applied to its data input terminals, and means responsive to said symbol sensing means sensing signals indicative of the balance at the end of said period to compare said balance signals for identity with the contents of said shift register.

References Cited in the file of this patent

UNITED STATES PATENTS

| | | |
|---|---|---|
| 2,634,052 | Bloch | Apr. 7, 1953 |
| 2,637,399 | Doty | May 5, 1953 |
| 2,737,342 | Nelson | Mar. 6, 1956 |
| 2,789,759 | Tootill et al. | Apr. 23, 1957 |
| 2,826,359 | Deerhake et al. | Mar. 11, 1958 |
| 2,850,234 | Bartelt et al. | Sept. 2, 1958 |
| 2,857,100 | Franck et al. | Oct. 21, 1958 |
| 2,861,744 | Schmitt et al. | Nov. 25, 1958 |
| 2,900,132 | Burns, et al. | Aug. 18, 1959 |
| 2,954,166 | Eckdahl et al. | Sept. 27, 1960 |

OTHER REFERENCES

Richards: "Arithmetic Operations in Digital," Van Nostrand Co., Inc. February 1955. Page 381 of interest.